US010379391B2

(12) United States Patent
Fukumoto et al.

(10) Patent No.: US 10,379,391 B2
(45) Date of Patent: *Aug. 13, 2019

(54) DISPLAY DEVICE

(71) Applicant: Funai Electric Co., Ltd., Daito, Osaka (JP)

(72) Inventors: Yasuyuki Fukumoto, Osaka (JP); Akihiro Fujikawa, Osaka (JP); Akira Yokawa, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 189 days.

This patent is subject to a terminal disclaimer.

(21) Appl. No.: 15/490,022

(22) Filed: Apr. 18, 2017

(65) Prior Publication Data
US 2017/0219870 A1 Aug. 3, 2017

Related U.S. Application Data

(63) Continuation of application No. 15/131,194, filed on Apr. 18, 2016, now Pat. No. 9,645,426, which is a (Continued)

(30) Foreign Application Priority Data

Jan. 30, 2013 (JP) ................................. 2013-014956

(51) Int. Cl.
G02F 1/1333 (2006.01)
G02F 1/1335 (2006.01)
F21V 29/70 (2015.01)

(52) U.S. Cl.
CPC ........ *G02F 1/133308* (2013.01); *F21V 29/70* (2015.01); *G02F 1/133603* (2013.01);
(Continued)

(58) Field of Classification Search
CPC .......... G02F 1/33308; G02F 1/133603; G02F 1/133608; G02F 1/133605;
(Continued)

(56) References Cited

U.S. PATENT DOCUMENTS 9,645,426 B2 * 5/2017 Fukumoto ......... G02F 1/133603
2008/0170400 A1 7/2008 Maruyama
2010/0208171 A1 8/2010 Yamazaki et al.
2012/0063122 A1 3/2012 Yokota et al.
2012/0147592 A1 6/2012 Takase
(Continued)

FOREIGN PATENT DOCUMENTS

JP 2008-198398 A 8/2008
JP 2009-152146 A 7/2009
(Continued)

OTHER PUBLICATIONS

Extended European Search Report of the corresponding European Application No. 14151845.6, dated Jun. 11, 2014.
(Continued)

Primary Examiner — David V Bruce
(74) Attorney, Agent, or Firm — Global IP Counselors, LLP

(57) ABSTRACT

A display device includes a display, a light source, a substrate, and a housing. The light source is mounted to the substrate. The housing includes a back panel with a surface to which the substrate is attached. The back panel has a recess and a positioning portion. The recess is at least partially disposed in the surface and is recessed with respect to the surface. The positioning portion holds the substrate relative to the housing and is disposed spaced apart from the recess in the surface.

20 Claims, 7 Drawing Sheets

Related U.S. Application Data continuation of application No. 14/154,336, filed on Jan. 14, 2014, now Pat. No. 9,335,039.

(52) U.S. Cl.
CPC .. *G02F 1/133608* (2013.01); *G02F 1/133605* (2013.01); *G02F 1/133606* (2013.01); *G02F 2001/133314* (2013.01); *G02F 2001/133322* (2013.01); *G02F 2001/133607* (2013.01); *G02F 2001/133628* (2013.01); *G02F 2201/465* (2013.01)

(58) Field of Classification Search
CPC ... G02F 1/133606; G02F 2001/133607; G02F 2001/133322; G02F 2001/133628; G02F 2001/133314; G02F 2201/465; F21V 29/70

See application file for complete search history.

(56) References Cited

U.S. PATENT DOCUMENTS

| | | |
|---|---|---|
| 2014/0218661 A1 | 8/2014 | Tanabe |
| 2015/0049508 A1 | 2/2015 | Suzuki et al. |
| 2015/0292712 A1 | 10/2015 | Nameda |

FOREIGN PATENT DOCUMENTS

| | | |
|---|---|---|
| JP | 2010-276857 A | 12/2010 |
| JP | 2012-155033 A | 8/2012 |
| JP | 2013-242499 A | 12/2013 |

OTHER PUBLICATIONS

The European search report of the European application No. 19153843.8, dated May 14, 2019.

\* cited by examiner

DISPLAY DEVICE

CROSS-REFERENCE TO RELATED APPLICATIONS

This is a continuation application of U.S. patent application Ser. No. 15/131,194, which is a continuation application of U.S. patent application Ser. No. 14/154,336. This application claims priority to Japanese Patent Application No. 2013-014956 filed on Jan. 30, 2013. The entire disclosures of U.S. patent application Ser. Nos. 15/131,194 and 14/154,336 and Japanese Patent Application No. 2013-014956 are hereby incorporated herein by reference.

BACKGROUND

Field of the Invention

The present invention generally relates to a display device. More specifically, the present invention relates to a display device including a rear face side holding member to which a heat dissipation member is attached.

Background Information

A display device including a rear face side holding member to which a heat dissipation member is attached is conventionally known (see Japanese Laid-Open Patent Application Publication No. 2008-198398 (Patent Literature 1), for example).

This Patent Literature 1 discloses a display device including a light source substrate on which is mounted an LED that irradiates a liquid crystal panel (e.g., a display component) with light from a rear face side, a base member (e.g., a heat dissipation member) that dissipates heat from the LED, and a back panel that holds the liquid crystal panel from the rear face side. With this display device, the base member and the back panel are positioned and fixed by being fastened together with nuts and bolts.

SUMMARY

It has been discovered that with the display device disclosed in Patent Literature 1, since the base member and the back panel are positioned and fixed by being fastened together with nuts and bolts, the nuts and bolts increase the number of required parts, and the work entailed by tightening the nuts and bolts increases the number of assembly steps.

One object of the present disclosure is to provide a display device with which the number of parts and the number of assembly steps can be reduced.

In view of the state of the know technology, a display device includes a display, a light source, a substrate, and a housing. The light source is mounted to the substrate. The housing includes a back panel with a surface to which the substrate is attached. The back panel has a recess and a positioning portion. The recess is at least partially disposed in the surface and is recessed with respect to the surface. The positioning portion holds the substrate relative to the housing and is disposed spaced apart from the recess in the surface.

Other objects, features, aspects and advantages of the present disclosure will become apparent to those skilled in the art from the following detailed description, which, taken in conjunction with the annexed drawings, discloses a preferred embodiment of a display device.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Referring to FIGS. 1 to 10, a liquid crystal television set 100 is illustrated in accordance with one embodiment. The liquid crystal television set 100 is an example of the "display device" of the present invention.

Figure 1:
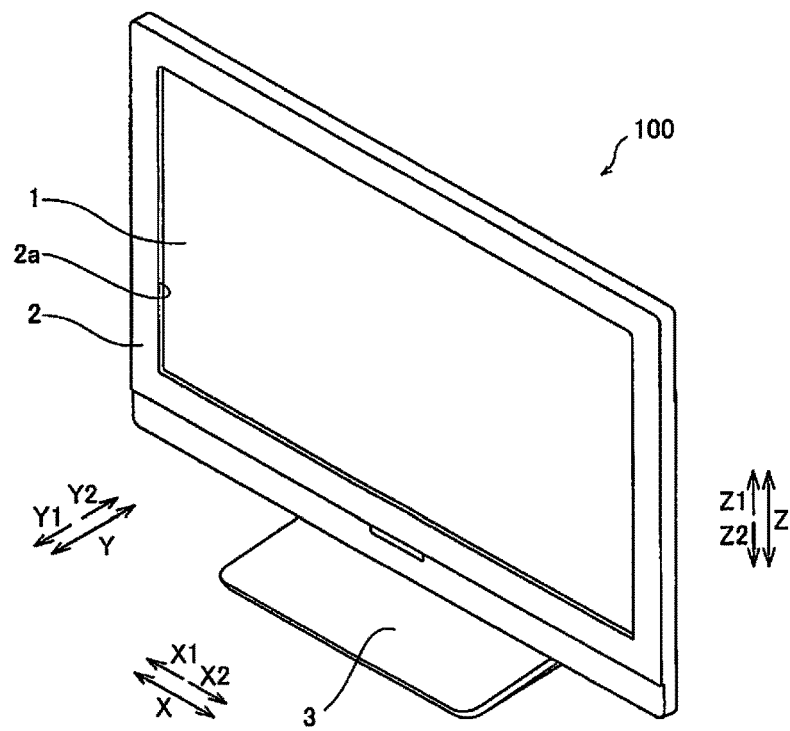
FIG. 1 is a front perspective view of a liquid crystal television set in accordance with one embodiment.
Figure 2:
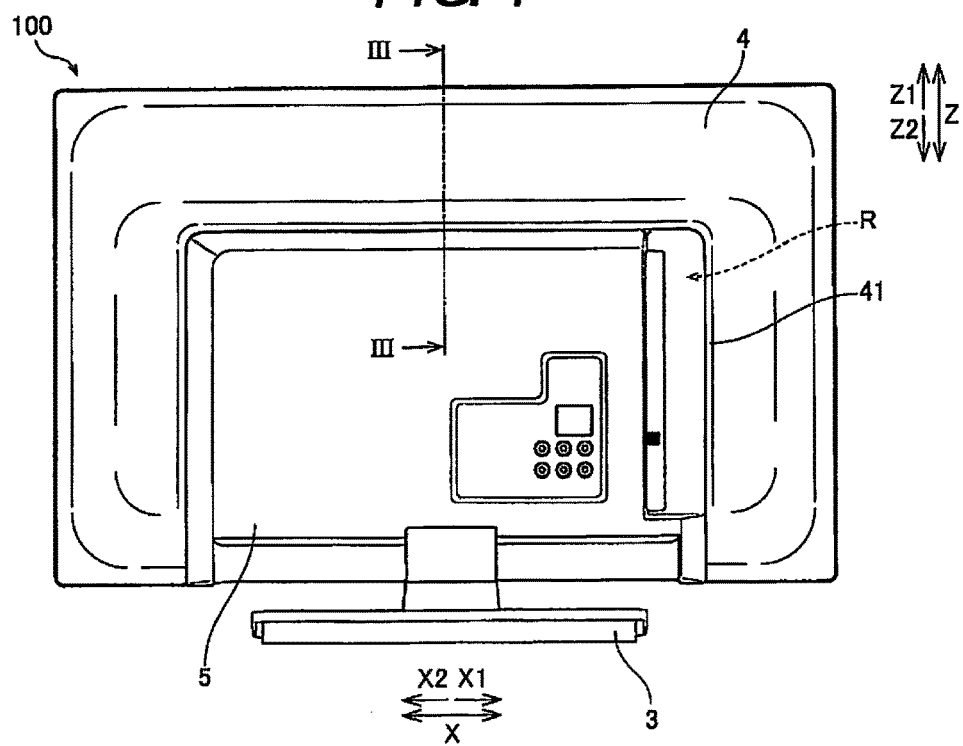
FIG. 2 is a rear elevational view of the liquid crystal television set illustrated in FIG. 1.
Figure 3:
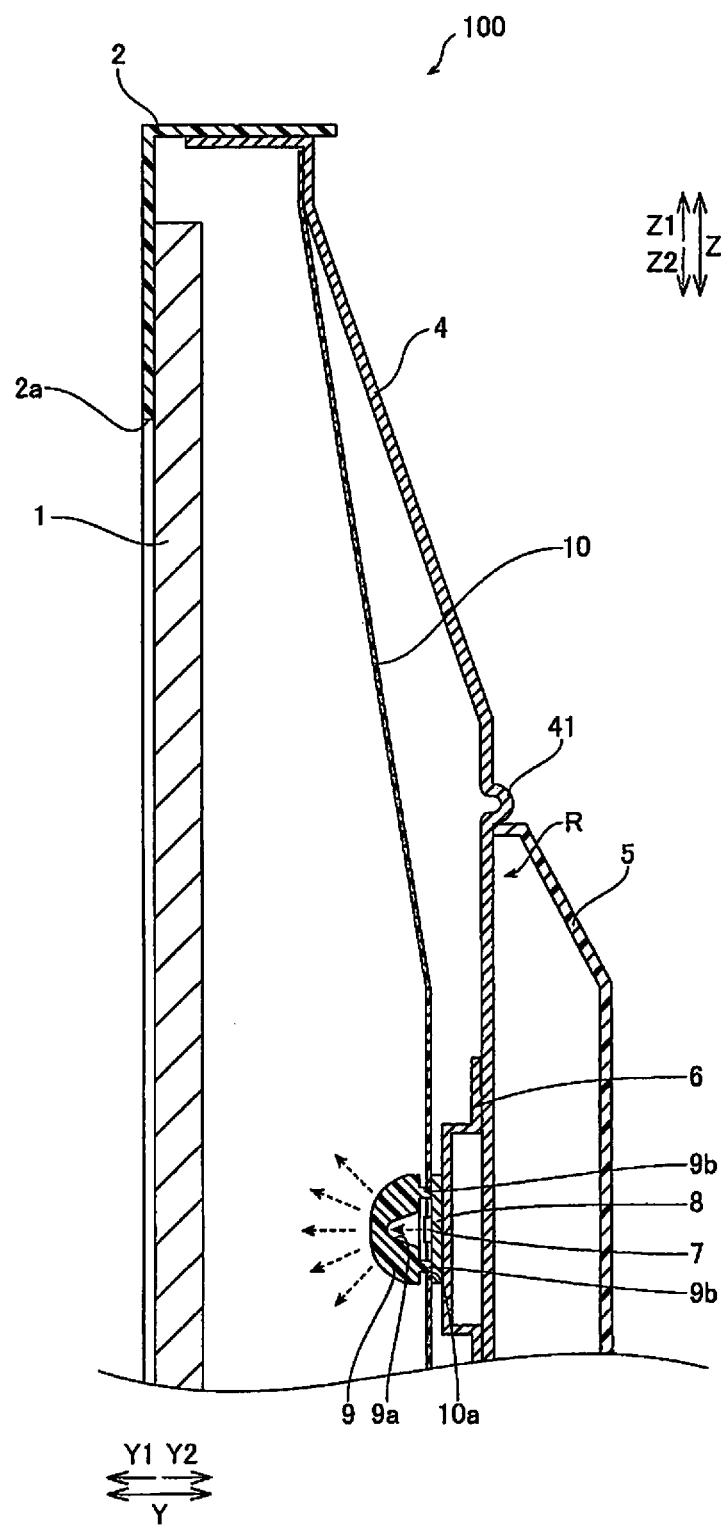
FIG. 3 is a partial cross sectional view of the liquid crystal television set, taken along III-III line in FIG. 2.

As shown in FIGS. 1 and 2, the liquid crystal television set 100 includes a display component 1, a front housing 2, and a stand member 3. The display component 1 has liquid crystal cells that display video. The front housing 2 is made of plastic and supports the display component 1 from the front side (the arrow Y1 direction side). The stand member 3 is made of plastic and supports the liquid crystal television set 100 from below (the arrow Z2 direction side). The front housing 2 is formed in the shape of a frame that is rectangular as seen from the front (as seen from the arrow Y1 direction side). More specifically, a rectangular opening 2a for exposing the display component 1 is provided near the center of the front housing 2. As shown in FIG. 3, the front housing 2 is formed in a concave shape that is recessed forward (the arrow Y1 direction).

Figure 4:
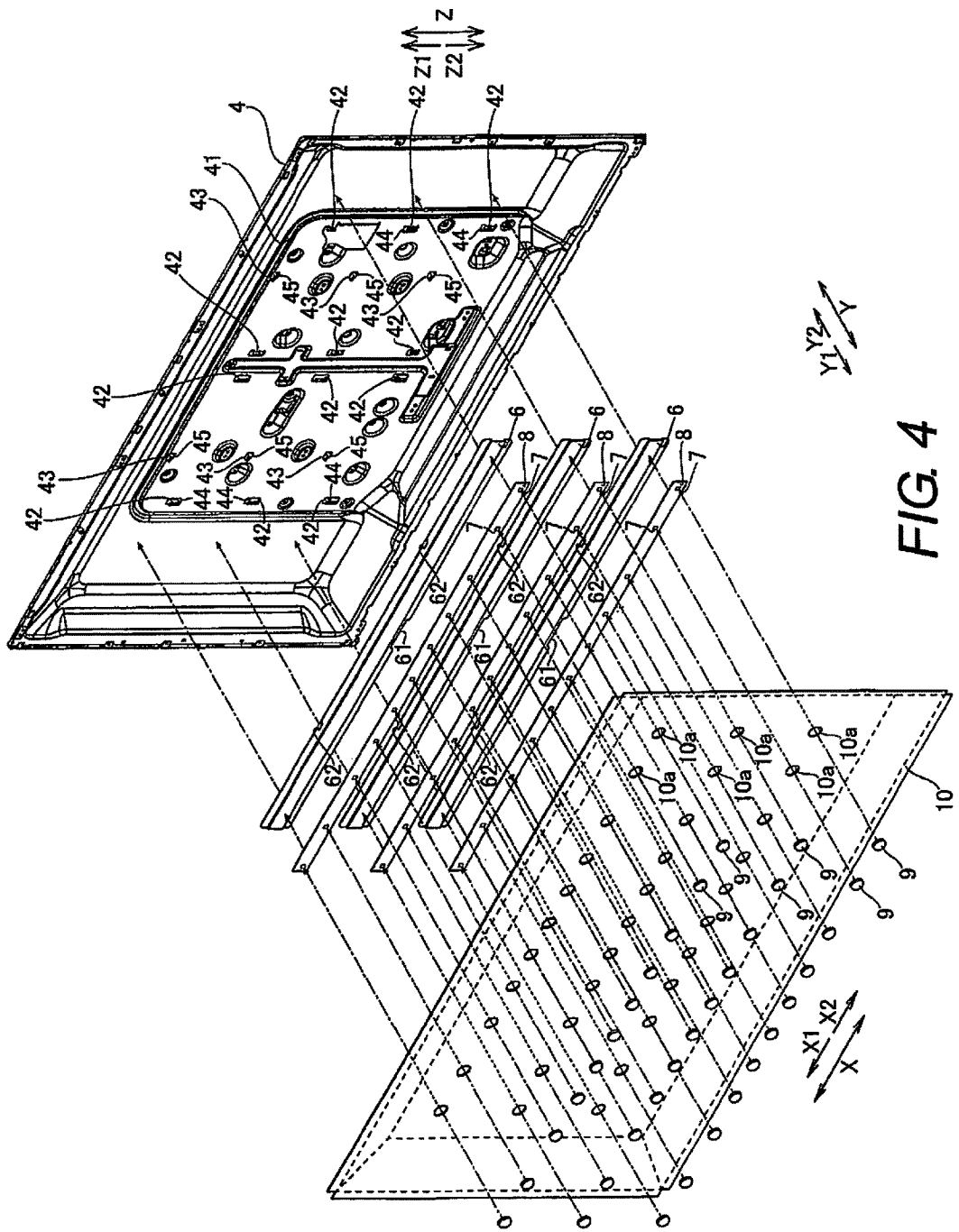
FIG. 4 is an exploded perspective view of the liquid crystal television set, illustrating a rear frame, a plurality of heat sinks, a plurality of light source substrates, a reflective sheet, and a plurality of diffusing lenses of the liquid crystal television set.

As shown in FIGS. 2 to 4, the liquid crystal television set 100 includes a rear frame 4, a cover member 5, a plurality of (three in this embodiment) heat sinks 6, a plurality of light sources 7, a plurality of (three in this embodiment) light source substrates 8, a plurality of diffusing lenses 9, and a reflective sheet 10. The rear frame 4 is made of sheet metal and supports the display component 1 from the rear face side (the arrow Y2 direction side). This rear frame 4 has a rectangular shape corresponding to the front housing 2. Also, the rear frame 4 is formed in a concave shape that is recessed rearward (the arrow Y2 direction). The rear frame 4 is an example of the "holding member" or the "rear face side holding member" of the present invention.

As shown in FIGS. 2 and 3, the cover member 5 is made of a plastic. The cover member 5 has a rectangular shape that is smaller than the rear frame 4, and is attached to the rear face side (the arrow Y2 direction side) of the sheet metal rear frame 4. More specifically, a convex component 41 that protrudes on the rear face side with respect to the rear frame 4 is formed on the rear face of the rear frame 4. This convex component 41 is disposed in an inverted U shape so as to surround the rectangular region R near the center of the rear frame 4, as seen from the rear face side of the rear frame 4. The cover member 5 is attached to the rear face of the rear frame 4 so as to cover the rectangular region R configured on the inside of the convex component 41 disposed in the inverted U shape. Various kinds of circuit board (not shown), such as a power supply board or a signal processing board, are attached in the rectangular region R on the rear face of the rear frame 4.

As shown in FIGS. 3 and 4, the heat sinks 6 are made of sheet metal. The heat sinks 6 extend in the direction in which one side of the rear frame extends (the horizontal direction: the X direction). The heat sinks 6 are disposed, spaced apart in the up and down direction (the Z direction), on the front of the rear frame 4 (the face on the arrow Y1 direction side). The light source substrates 8 are respectively disposed on the front of these three heat sinks 6. The light sources 7 are mounted on the light source substrates 8. The light sources 7 irradiate the display component 1 with light from the rear face side (the arrow Y2 direction side). The light sources 7 are made up of LEDs (light emitting diodes) or the like. A plurality of the light sources 7 are mounted on the front of each of the light source substrates 8 such that the light sources 7 are spaced apart in the direction in which each of the light source substrates 8 extends (the X direction). The heat sinks 6 are an example of the "heat dissipation member" of the present invention.

As shown in FIGS. 3 and 4, the diffusing lenses 9 respectively cover the plurality of light sources 7, and are attached to the front of the light source substrates 8 on the side where the plurality of light sources 7 are mounted (the face on the arrow Y1 direction side). These diffusing lenses 9 are made of acrylic or another such plastic, and have the function of diffusing light emitted by the light sources 7 to the display component 1 side (see the dotted arrows in FIG. 3). As shown in FIG. 3, concave components 9a are provided near the center of the bottom face of the diffusing lenses 9 (at positions corresponding to the light sources 7 on the front of the light source substrates 8). The diffusing lenses 9 are provided with columnar bosses 9b that extend from the bottom faces of the diffusing lenses 9 to the light source substrate 8 side. These bosses 9b are adhesively bonded to the front of the light source substrates 8, thereby attaching the diffusing lenses 9 at positions corresponding to the light sources 7 on the front of the light source substrates 8.

Also, as shown in FIGS. 3 and 4, the reflective sheet 10 reflects light from the light sources 7 to the display component 1 side. The reflective sheet 10 is disposed between the light source substrates 8 and the diffusing lenses 9. This reflective sheet 10 has a shape that conforms to the rear frame 4 (a concave shape that is recessed to the arrow Y2 direction side) in a state of being disposed on the front of the light source substrates 8. Various kinds of optical member (not shown), such as a diffuser for further diffusing light diffused by the diffusing lenses 9 to the display component 1 side, are disposed between the reflective sheet 10 and the display component 1. A plurality of holes 10a corresponding to the plurality of LEDs 7 (diffusing lenses 9) are formed in the reflective sheet 10.

As shown in FIGS. 4 to 10, in this embodiment, the rear frame 4 integrally includes positioning components 42 for positioning the heat sinks 6, and hooks 43 for fixing the heat sinks 6 positioned by the positioning components 42. The hooks 43 are disposed on the opposite side from the positioning components 42 (the arrow Z1 direction side) with respect to the heat sinks 6. The hooks 43 are an example of the "fixing component" of the present invention.

Figure 5:
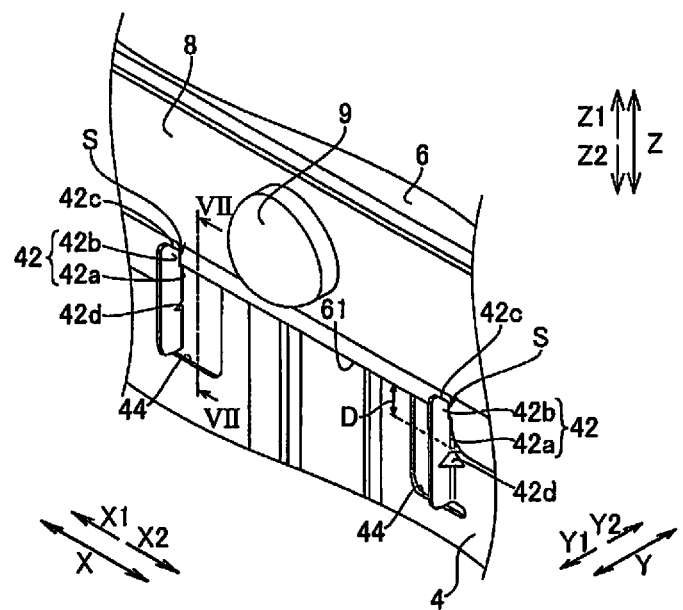
FIG. 5 is an enlarged, partial perspective view of the liquid crystal television set, illustrating a state in which a heat sink has been positioned by a positioning component of the rear frame.
Figure 6:
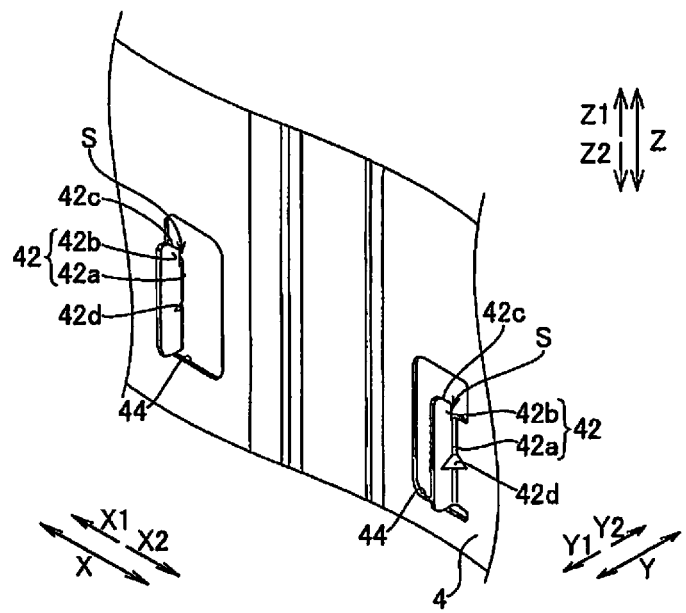
FIG. 6 is an enlarged, partial perspective view of the liquid crystal television set, illustrating a state in which the heat sink illustrated in FIG. 5 has been removed.
Figure 7:
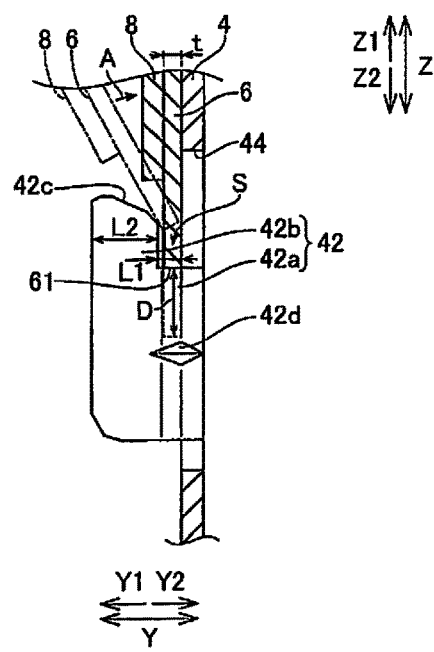
FIG. 7 is a partial cross sectional view of the liquid crystal television set, taken along VII-VII line in FIG. 5.

As shown in FIGS. 5 to 7, the positioning components 42 include contact components 42a and warping suppressors 42b. The contact components 42a contact with the side end faces on the lower side (the arrow Z2 direction side) of the sheet metal heat sinks 6. The warping suppressors 42b are formed on the front side (the arrow Y1 direction side) of the sheet metal heat sinks 6 and suppress warping of the sheet metal heat sinks 6 to the front side that is caused by heat from the light sources 7. FIG. 5 is a detail view of the positioning components 42 formed near the center in the horizontal direction (the X direction) and near the center in the up and down direction (the Z direction) of the rear frame 4. In FIG. 5, the reflective sheet 10 disposed on the front of the light source substrates 8 is not shown in order to simplify the description. The positioning components 42 that include the contact components 42a and the warping suppressors 42b are disposed at positions on the rear frame 4 corresponding to near the center of the heat sinks 6 in the horizontal direction (the X direction).

Specifically, as shown in FIGS. 4 to 7, cut-outs 61 extending in the horizontal direction are formed near the center of the heat sinks 6 in the horizontal direction (the X direction: the lengthwise direction of the heat sinks 6). The contact components 42a are disposed so as to contact with the inner faces near both ends in the horizontal direction of the portion corresponding to the cut-outs 61 of the heat sinks 6. The warping suppressors 42b are disposed on the front side (the arrow Y1 direction side) near both ends in the horizontal direction of the portion corresponding to the cut-outs 61 of the heat sinks 6. The contact components 42a and the warping suppressors 42b are both formed in a flat shape extending in the longitudinal direction (the Y direction) and the up and down direction (the Z direction).

More specifically, as shown in FIG. 7, the contact components 42a are formed in a flat shape having a length L1 in the longitudinal direction (the Y direction) that is greater than the thickness t of the heat sinks 6. The warping suppressors 42b are formed in a flat shape having a length L2 in the longitudinal direction that is greater than the length L1 of the contact components 42a in the longitudinal direction. Here, the warping suppressors 42b are disposed higher than the upper ends of the contact components 42a (the ends on the arrow Z1 direction side). Consequently, groove-shaped spaces S are formed between the end faces on the rear frame 4 side (the arrow Y2 direction side) of the warping suppressors 42b disposed above the upper ends of the contact components 42a, and the front face of the rear frame 4 (the face on the arrow Y1 direction side), respectively. The areas near the lower ends of the heat sinks 6 where the light source substrates 8 are attached (the area near the ends on the arrow Z2 direction side) are inserted into this groove-shaped spaces S. The upper end faces of the warping suppressors 42b have sloped faces 42c that slope upward from the rear frame 4 toward the opposite side from the rear frame 4. These sloped faces 42c are provided so that the heat sinks 6 to which the light source substrates 8 have been attached can be easily inserted into the groove-shaped spaces S in a state in which the heat sinks 6 have been inclined forward with respect to the rear frame 4 (see the one-dot chain lines in FIG. 7). The arrow A in FIG. 7 indicates the attachment direction in which the heat sinks 6 to which the light source substrates 8 have been attached to the front face of the rear frame 4. This arrow A in FIG. 7 is the same as the arrow A in FIG. 10 (discussed below).

As shown in FIG. 4, in this embodiment, the positioning components 42 that include the contact components 42a and the warping suppressors 42b are disposed not only at the positions of the rear frame 4 corresponding to near the center of the heat sinks 6 in the horizontal direction (the X direction), but also at the positions of the rear frame 4 corresponding to near both ends of the heat sinks 6 in the horizontal direction. More specifically, two each of the positioning components 42 (total of four) are disposed at the positions of the rear frame 4 corresponding to near the center of the heat sinks 6 in the horizontal direction, and at the positions of the rear frame 4 corresponding to near the ends of the heat sinks 6 in the horizontal direction. More precisely, the two positioning components 42 corresponding to near the center of the heat sinks 6 in the horizontal direction are disposed higher (more on the arrow Z1 direction side) than the two positioning components 42 corresponding to near the ends of the heat sinks 6 in the horizontal direction by the dimension of the depth D (see FIGS. 5 and 7) of the cut-outs 61 in the heat sinks 6 in the up and down direction (the Z direction). The contact components 42a of the two positioning components 42 corresponding to near the ends of the heat sinks 6 in the horizontal direction are configured so as to contact with the side end faces on the lower side (the arrow Z2 direction side) near the ends of the heat sinks 6 in the horizontal direction. For example, as shown in FIG. 8, the contact component 42a of the positioning component 42 corresponding to near the end of the heat sink 6 on the arrow X2 direction side contacts with the lower side end face near the end of the heat sink 6 on the arrow X2 direction side.

Figure 8:
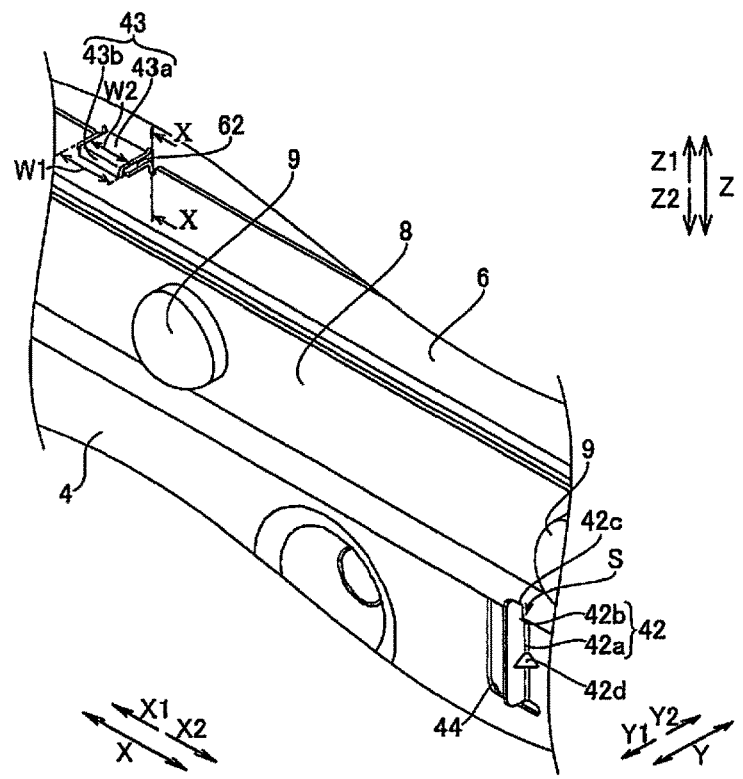
FIG. 8 is an enlarged, partial perspective view of the liquid crystal television set, illustrating a state in which the heat sink has been fixed to a hook of the rear frame.
Figure 10:
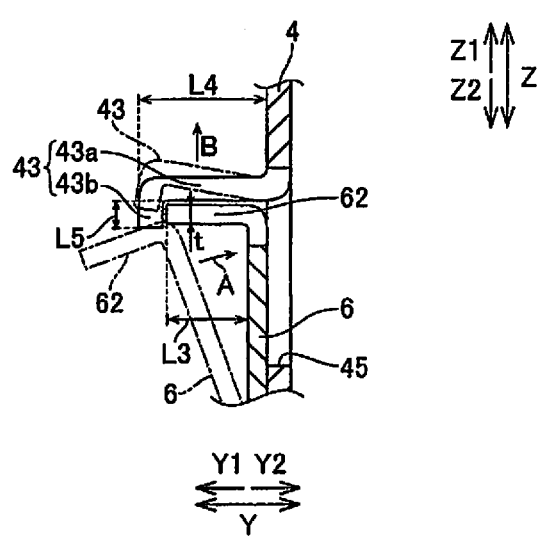
FIG. 10 is a partial cross sectional view of the liquid crystal television set, taken along X-X line in FIG. 8.

As shown in FIGS. 8 and 10, the heat sinks 6 each include a plurality of upright components 62. The upright components 62 are erected on the opposite side of the heat sink 6 from the positioning component 42 (the arrow Z1 direction side), toward the opposite side from the rear frame 4 (the arrow Y1 direction side). As shown in FIG. 10, the hooks 43 engage with the upright components 62 of the heat sinks 6, respectively. The hooks 43 can be bent and deformed in a direction (see the arrow B in FIG. 10) that intersects the attachment direction (see the arrow A in FIG. 10) when the upright components 62 of the heat sinks 6 positioned by the positioning components 42 are attached to the hooks 43. FIG. 8 is a detail view of the positioning components 42 and the hooks 43 disposed near the center of the rear frame 4 in the up and down direction (the Z direction) and near the end on one side in the horizontal direction (the arrow X2 direction side). For the sake of simplicity, the reflective sheet 10 disposed on the front of the light source substrates 8 is not shown in FIG. 8.

Figure 9:
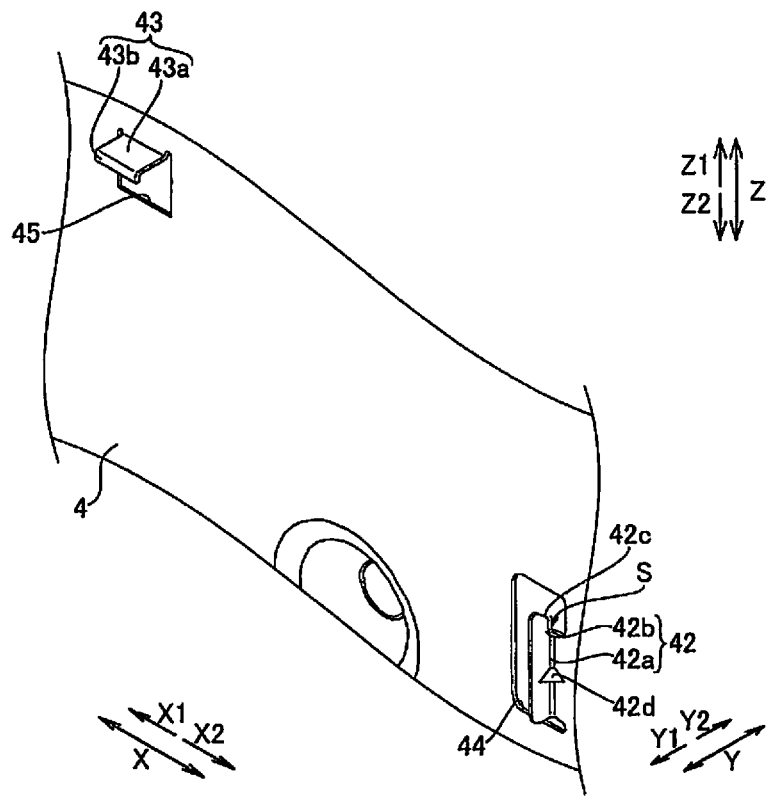
FIG. 9 is an enlarged, partial perspective view of the liquid crystal television set, illustrating a state in which the heat sink in FIG. 8 has been removed.

As shown in FIGS. 8 to 10, the hooks 43 each have a long portion 43a and a short portion 43b (e.g., a distal end portion). The long portions 43a are erected forward (the arrow Y1 direction side) with respect to the rear frame 4. The short portions 43b extend downward (the arrow Z2 direction side) from the ends of the long portions 43a on the opposite side from the rear frame 4 (the arrow Y1 direction side), respectively. These long portions 43a and the short portions 43b are both formed in a flat shape. More specifically, the long portions 43a are formed in a flat shape extending in the horizontal direction (the X direction) and in the longitudinal direction (the Y direction). The short portions 43b are formed in a flat shape extending in the horizontal direction and in the up and down direction (the Z direction). As shown in FIG. 8, the width W1 in the horizontal direction of the upright components 62 of the heat sinks 6 is greater than the width W2 of the hooks 43 (the long portions 43a and the short portions 43b) in the horizontal direction. As shown in FIG. 10, the long portions 43a have a length LA in the longitudinal direction that is greater than the length L3 of the upright components 62 in the longitudinal direction. Also, the short portions 43b have a length L5 in the up and down direction that is greater than the thickness t of the upright components 62 (the thickness of the heat sinks 6). The long portions 43a and the short portions 43b are disposed so as to be spaced slightly apart with respect to the upper surfaces and front end faces of the upright components 62 in a state in which the heat sinks 6 have been attached to the rear frame 4.

As shown in FIG. 4, in this embodiment, the plurality of the positioning components 42 and the plurality of the hooks 43 are provided in the horizontal direction (the X direction). More specifically, two each of the positioning components 42 (total of four) are disposed at the positions of the rear frame 4 corresponding to near the center of the heat sinks 6 in the horizontal direction, and at the positions of the rear frame 4 corresponding to near the ends of the heat sinks 6 in the horizontal direction. Two each of the hooks 43 (total of four) are disposed between the positioning component 42 disposed farthest to the back in FIG. 4 (on the arrow X1 direction side) and the positioning component 42 disposed the next farthest to the back, and between the positioning component 42 disposed farthest to the front in FIG. 4 (on the arrow X2 direction side) and the positioning component 42 disposed the next farthest to the front.

As shown in FIGS. 4 to 10, in this embodiment the positioning components 42 and the hooks 43 are each formed integrally with the rear frame 4 by cutting and lifting the sheet metal rear frame 4 on the heat sink 6 side (the arrow Y1 direction side). Consequently, holes 44 and 45 are formed in the portions of the rear frame 4 corresponding to the positioning components 42 and the hooks 43, respectively. As shown in FIGS. 5 to 9, reinforcing ribs 42d for reinforcing the positioning components 42 are integrally formed near the center in the up and down direction (the Z direction) of the boundary portion between the positioning components 42 (contact components 42a) and the rear frame 4. These reinforcing ribs 42d have been given a crinkle or texture finish near the center of the boundary portion of the positioning components 42 with the rear frame 4, and are formed so as to protrude from the hole 44 side toward the opposite side from the holes 44, with respect to the boundary portion of the positioning components 42 with the rear frame 4.

In this embodiment, as discussed above, the positioning components 42 for positioning the heat sinks 6 and the hooks 43 for fixing the heat sinks 6 positioned by the positioning components 42 are formed integrally with the rear frame 4. Thus, there is no need to separately provide nuts, bolts, or other such parts for positioning and fixing the heat sinks 6 and the rear frame 4. Therefore, the number of parts and the number of steps can be reduced correspondingly.

In this embodiment, as discussed above, the positioning components 42 are provided with the contact components 42a that contact with the side end faces on the lower side (the arrow Z2 direction side) of the heat sinks 6, and the warping suppressors 42b that are formed on the front side (the arrow Y1 direction side) of the sheet metal heat sinks 6 and suppress warping of the sheet metal heat sinks 6 to the front side caused by heat from the light sources 7. Consequently, even if heat from the light sources 7 should cause the heat sinks 6 to warp, warping of the heat sinks 6 can be suppressed by the warping suppressors 42b, while the heat sinks 6 can be easily positioned by the contact components 42a.

In this embodiment, as discussed above, the positioning components 42 that include the contact components 42a and the warping suppressors 42b are disposed at positions of the rear frame 4 corresponding to near the center of the heat sinks 6 in the direction in which one side of the rear frame 4 extends (the horizontal direction: the X direction). Consequently, the positioning components 42 that include the contact components 42a and the warping suppressors 42b are disposed so as to correspond to the portion of the heat sinks 6 where the center of gravity is located and where warping tends to occur (near the center). Thus, warping of the heat sinks 6 can be effectively suppressed while the heat sinks 6 can be stably positioned.

In this embodiment, as discussed above, the cut-outs 61 are formed near the center of the heat sinks 6 in the horizontal direction (the X direction: the lengthwise direction of the heat sinks 6). The contact components 42a are configured to contacts with the inner faces on the lower side (the arrow Z2 direction side) of the portion of the heat sinks 6 corresponding to the cut-outs 61. The warping suppressors 42b are formed on the front side (the arrow Y1 direction side) of the portion of the heat sinks 6 corresponding to the cut-outs 61. Consequently, since the warping suppressors 42b are disposed so as to correspond to the portion where warping tends to occur (the center portion in the short-side direction of the heat sinks 6) on the inside by the depth D (see FIGS. 5 and 7) in the up and down direction (the Z direction) of the cut-outs 61 with respect to the portion of the heat sinks 6 where the cut-outs 61 are not formed, warping of the heat sinks 6 can be more effectively suppressed.

In this embodiment, as discussed above, the positioning components 42 that include the contact components 42a and the warping suppressors 42b are disposed not only at positions of the rear frame 4 corresponding to near the center of the heat sinks 6 in the horizontal direction (the X direction), but also at positions of the rear frame 4 corresponding to near both ends of the heat sinks 6 in the horizontal direction. Consequently, the positioning components 42 that include the contact components 42a and the warping suppressors 42b are disposed so as to correspond to near the ends of the heat sinks 6 in addition to near the center of the heat sinks 6. Thus, warping of the heat sinks 6 can be better suppressed, while the heat sinks 6 can be positioned more stably.

In this embodiment, as discussed above, the hooks 43 are disposed on the opposite side (the arrow Z1 direction side) from the positioning components 42 with respect to the heat sinks 6. Consequently, unlike when the hooks 43 and the positioning components 42 are disposed on the same side with respect to the heat sinks 6, the job of using the positioning components 42 to position the heat sinks 6, and the job of using the hooks 43 to fix the heat sinks 6 can each be carried out separately on one or the other side of the heat sinks 6. Thus, the jobs of positioning and fixing the heat sinks 6 can be performed more efficiently.

In this embodiment, as discussed above, the heat sinks 6 are provided with the upright components 62 erected on the opposite side (the arrow Y1 direction side) from the rear frame 4, from the ends of the heat sinks 6 on the opposite side from the positioning components 42 (the arrow Z1 direction side). The hooks 43 engage with the upright components 62 of the heat sinks 6. The upright components 62 of the heat sinks 6 positioned by the positioning components 42 can be bent in a direction (see the arrow B in FIG. 10) that intersects the attachment direction (see the arrow A in FIG. 10) in which the upright components 62 of the heat sinks 6 are attached to the hooks 43. Consequently, the heat sinks 6 can be securely fixed to the rear frame 4 by the hooks 43 (made of sheet metal) that engage with the upright components 62 of the heat sinks 6. Also, even when the heat sinks 6 have been positioned in the job of attaching the heat sinks 6 (the upright components 62) to the rear frame 4 (the hooks 43), since the hooks 43 can be bent and deformed in a direction that intersects the attachment direction of the upright components 62, it is less likely that the job of attaching the heat sinks 6 to the rear frame 4 will be impeded by the hooks 43. As a result, the heat sinks 6 can be attached easily and securely to the rear frame 4.

In this embodiment, as discussed above, the positioning components 42 and the hooks 43 are each formed integrally with the sheet metal rear frame 4 by cutting and lifting the sheet metal rear frame 4. Consequently, it is a simple matter for the positioning components 42 and the hooks 43 to be formed integrally with the sheet metal rear frame 4, merely by cutting and lifting a part of the sheet metal rear frame 4.

In this embodiment, as discussed above, the plurality of each of the positioning components 42 and the hooks 43 are provided in the direction (the X direction) in which the heat sinks 6 extend. Consequently, the positioning and fixing of the heat sinks 6 can be carried out more reliably by means of the plurality of positioning components 42 and hooks 43 provided in the direction in which the heat sinks 6 extend.

The embodiment disclosed herein is just an example in every respect, and should not be interpreted as being limiting in nature. The scope of the invention being indicated by the appended claims rather than by the above description of the embodiments, all modifications within the meaning and range of equivalency of the claims are included.

For example, in the above embodiment, the liquid crystal television set 100 is used as an example of the display device of the present invention. However, the present invention is not limited to this. Besides the liquid crystal television set 100, the present invention can also be applied to any normal display device, such as a PC (personal computer) display device.

Figure 11:
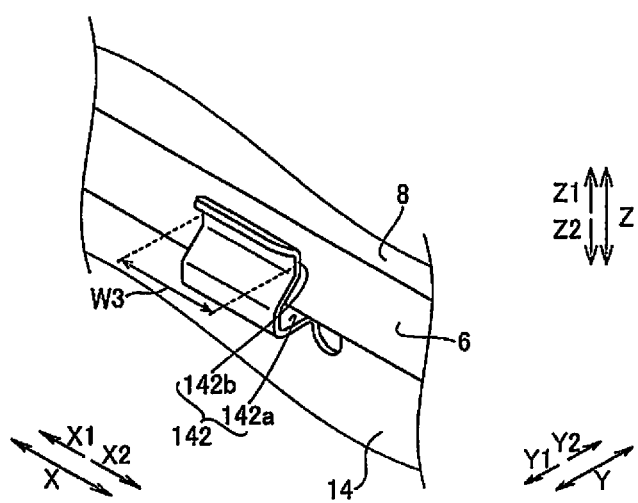
FIG. 11 is an enlarged, partial perspective view of a positioning component of a rear frame in accordance with a modification example of the embodiment.

Also, in the above embodiment, as shown in FIG. 6, the positioning components 42 have the flat contact components 42a and the warping suppressors 42b extending in the up and down direction (the Z direction) and the longitudinal direction (the Y direction). However, the present invention is not limited to this. As in the modification example shown in FIG. 11, positioning components 142 can each include a contact component 142a and a warping suppressor 142b. The contact components 142a extend in the longitudinal direction and the horizontal direction (the X direction), while the warping suppressors 142b extend in the horizontal direction and the up and down direction. Again in the modification example shown in FIG. 11, just as in the above embodiment, the positioning components 142 are formed integrally with a rear frame 14 by cutting and lifting the sheet metal rear frame 14. In the modification example shown in FIG. 11, the warping suppressors 142b have a specific width W3 in the horizontal direction and are disposed so as to come into planar contact with the front surfaces (the faces on the arrow Y1 direction side) near the ends on the lower side (the arrow Z2 direction side) of the heat sinks 6. Thus, warping of the heat sinks 6 can be suppressed while the heat sinks 6 are securely held by being sandwiched between the warping suppressors 142b and the rear frame 14. The rear frame 14 is an example of the "holding member" or the "rear face side holding member" of the present invention.

Also, in the above embodiment, two each of the positioning components (total of four) are disposed so as to correspond to near the center and near the ends of the heat sinks. However, the present invention is not limited to this. The number of the positioning components disposed so as to correspond to near the center of the heat sinks can be one, or it can be three or more. Similarly, the number of positioning components disposed so as to correspond to near the ends of the heat sinks can be one, or it can be three or more. Also, positioning components can be disposed so as to correspond to portions other than near the center and near the ends of the heat sinks.

Also, in the above embodiment, the notches or cut-outs are provided near the center of the heat sinks. The positioning components corresponding to near the center of the heat sinks are disposed higher, by an amount equal to the depth of the notches in the up and down direction, than the positioning components corresponding to near the ends of the heat sinks. However, the present invention is not limited to this. With the present invention, notches need not be provided to the heat sinks, and positioning components corresponding to near the center of the heat sinks, and positioning components corresponding to near the ends of the heat sinks can be disposed at positions that are at the same height.

Also, in the above embodiment, the positioning components are disposed lower than the heat sinks. The hooks are disposed higher than the heat sinks. The positioning components and the hooks are disposed on mutually opposite sides of the heat sinks. However, the present invention is not limited to this. With the present invention, the positions of the positioning components and the hooks with respect to the heat sinks can be reversed from that given above. Specifically, the positioning components and the hooks can be provided higher and lower than the heat sinks, respectively. Also, with the present invention, the positioning components and the hooks can be disposed on the same side with respect to the heat sinks.

Also, in the above embodiment, the upright components are provided to the heat sinks. The hooks corresponding to the upright components are provided to the rear frame. The heat sinks are fixed to the rear frame by engaging the upright components and the hooks with respect to each other. However, the present invention is not limited to this. With the present invention, the heat sinks can be fixed to the rear frame by integrally forming fixing means other than the hook structure with the rear frame.

In the illustrated embodiment, the display device includes a display component, a light source, a light source substrate, a heat dissipation member, and a holding member. The light source is disposed on a rear side of the display device with respect to the display component and irradiates the display component with light from the rear side. The light source is mounted to the light source substrate. The heat dissipation member is made of sheet metal. The light source substrate is attached the heat dissipation member. The heat dissipation member dissipates heat from the light source. The holding member is made of sheet metal. The heat dissipation member is attached to the holding member. The holding member holds the display component from the rear side. The holding member integrally includes a positioning component for positioning the heat dissipation member, and a fixing component for fixing the heat dissipation member positioned by the positioning component.

With this display device, as mentioned above, because the sheet metal holding member is configured so as to integrally include the positioning component and the fixing component, there is no need to separately provide nuts, bolts, or other such parts for positioning and fixing the heat dissipation member and the holding member. Thus, the number of parts and the number of steps can be reduced correspondingly.

In the illustrated embodiment, with the display device, the positioning component includes a contact component and a warping suppressor. The contact component contacts with a side end face of the heat dissipation member. The warping suppressor is disposed on a front side of the display device with respect to the heat dissipation member and suppresses warping of the heat dissipation member towards the front side due to the heat from the light source. With this configuration, even if heat from the light source should cause the heat dissipation member to warp, warping of the heat dissipation member can be suppressed by the warping suppressor, while the heat dissipation member can be easily positioned by the contact component.

In this case, the holding member can have a rectangular shape. The heat dissipation member can be formed so as to extend in a direction in which one side of the rectangular holding member extends. The positioning component can be located at a position of the holding member corresponding to a position near or adjacent to a center of the heat dissipation member at least in the direction in which the one side extends. With this configuration, the positioning component that includes the contact component and the warping suppressor is disposed so as to correspond to the portion of the heat dissipation member where the center of gravity is located and where warping tends to occur (near the center). Thus, warping of the heat dissipation member can be effectively suppressed while the heat dissipation member can be stably positioned.

With the display device in which the heat dissipation member is formed so as to extend in the direction in which one side of the holding member extends, a cut-out can be formed near or adjacent to the center of the heat dissipation member in the direction in which the one side extends (lengthwise direction). The contact component of the positioning component can contact with an inner face of the cut-out (e.g., a portion of the heat dissipation member corresponding to the cut-out). The warping suppressor of the positioning component can be disposed on the front side with respect to the cut-out (e.g., a portion of the heat dissipation member corresponding to the cut-out). With this configuration, the warping suppressor is disposed so as to correspond to the portion where warping tends to occur (the center portion in the short-side direction of the heat dissipation member) on the inside corresponding to the depth of the cut-out with respect to the portion of the heat dissipation member where the cut-out is not formed. Thus, warping of the heat dissipation member can be more effectively suppressed.

With the display device in which the heat dissipation member is formed so as to extend in the direction in which one side of the holding member extends, the holding member further includes additional positioning components that are located at positions of the holding member corresponding to positions near or adjacent to both ends of the heat dissipation member in the direction in which the one side extends, respectively. With this configuration, the positioning components (e.g., the positioning component and the additional positioning components) are disposed so as to correspond not only to near the center of the heat dissipation member, but also to near both ends of the heat dissipation member. Thus, warping of the heat dissipation member can be better suppressed, while the heat dissipation member can be positioned more stably.

With this display device, the fixing component can be disposed on an opposite side from the positioning component with respect to the heat dissipation member. With this configuration, unlike when the fixing component and the positioning component are disposed on the same side with respect to the heat dissipation member, the job of using the positioning component to position the heat dissipation member, and the job of using the fixing component to fix the heat dissipation member can each be carried out separately on one or the other side of the heat dissipation member. Thus, the jobs of positioning and fixing the heat dissipation member can be performed more efficiently.

In this case, the heat dissipation member can includes an upright component that extends away from the holding member from an end portion of the heat dissipation member that is located opposite from an opposite end portion of the heat dissipation member corresponding to the positioning component. The fixing component can include a hook that engages with the upright component of the heat dissipation member. The hook can be bent in a direction that intersects an attachment direction of the heat dissipation member relative to the fixing component while the upright component is being attached to the fixing component. With this configuration, the heat dissipation member can be securely fixed with respect to the holding member by the hook (made of sheet metal) that engages with the upright component of the heat dissipation member. Also, even when the heat dissipation member has been positioned during attachment of the heat dissipation member (upright component) to the holding member (hook), since the hook can be bent and deformed in a direction that intersects the attachment direction of the upright component, it is less likely that the job of attaching the heat dissipation member to the holding member will be impeded by the hook. As a result, the heat dissipation member can be attached easily and securely to the holding member.

With the display device, the positioning component and the fixing component are integrally formed on the sheet metal holding member by cutting and lifting a sheet metal. With this configuration, it is a simple matter for the positioning component and the fixing component to be formed integrally with the sheet metal holding member, merely by cutting and lifting a part of the sheet metal (or the sheet metal holding member).

With the display device, the holding member can have a rectangular shape. The holding member integrally includes a plurality of positioning components and a plurality of fixing components. The heat dissipation member can extend in a direction in which one side of the rectangular holding member extends. The plurality of the positioning components and the plurality of the fixing components are arranged with respect to each other in the direction in which the heat dissipation member extends. With this configuration, the positioning and fixing of the heat dissipation member can be carried out more reliably by means of the plurality of positioning components and the plurality of the fixing components provided in the direction in which the heat dissipation member extends.

With the display device, the contact component can have a first dimension measured in a direction from the front side to the rear side. The warping suppressor can have a second dimension measured in the direction from the front side to the rear side. The second dimension being larger than the first dimension.

With the display device, the heat dissipation member can have a thickness that is smaller than the first dimension of the contact component.

With the display device, the upright component has a third dimension measured in a direction from a front side of the display device to the rear side. The hook has a fourth dimension measured in the direction from the front side to the rear side. The fourth dimension is larger than the third dimension.

With the display device, the hook has a distal end portion that extends in a direction that intersects the direction from the front side to the rear side. The distal end portion has a fifth dimension measured in the direction that intersects the direction from the front side to the rear side. The fifth dimension is larger than a thickness of the upright component.

With the present invention, as discussed above, the number of parts and the number of steps can be reduced.

In accordance with a first aspect, a display device comprises: a display component; a light source disposed on a rear side of the display device with respect to the display component, the light source being configured to irradiate the display component with light from the rear side; a light source substrate to which the light source is mounted; a heat dissipation member to which the light source substrate is attached, the heat dissipation member being made of sheet metal and configured to dissipate heat from the light source; and a holding member to which the heat dissipation member is attached, the holding member being made of sheet metal and holding the display component from the rear side, the holding member integrally including a positioning component and a fixing component, the positioning component positioning the heat dissipation member, the fixing component fixing the heat dissipation member positioned by the positioning component.

In accordance with a second aspect, with the display device according to the first aspect, the positioning component includes a contact component and a warping suppressor, the contact component contacting with a side end face of the heat dissipation member, the warping suppressor being disposed on a front side of the display device with respect to the heat dissipation member, the warping suppressor being configured to suppress warping of the heat dissipation member towards the front side due to the heat from the light source.

In accordance with a third aspect, with the display device according to the second aspect, the holding member has a rectangular shape, the heat dissipation member extends in a direction in which one side of the holding member extends, and the positioning component is located at a position of the holding member corresponding to a position adjacent to a center of the heat dissipation member in the direction in which the one side extends.

In accordance with a fourth aspect, with the display device according to the third aspect, the heat dissipation member has a cut-out adjacent to the center of the heat dissipation member in the direction in which the one side extends, the contact component of the positioning component contacts with an inner face of the cut-out, and the warping suppressor of the positioning component is disposed on the front side with respect to the cut-out.

In accordance with a fifth aspect, with the display device according to the third aspect, the holding member further includes additional positioning components that are located at positions of the holding member corresponding to positions adjacent to both ends of the heat dissipation member in the direction in which the one side extends, respectively.

In accordance with a sixth aspect, with the display device according to the first aspect, the fixing component is disposed on an opposite side from the positioning component with respect to the heat dissipation member.

In accordance with a seventh aspect, with the display device according to the sixth aspect, the heat dissipation member includes an upright component that extends away from the holding member from an end portion of the heat dissipation member that is located opposite from an opposite end portion of the heat dissipation member corresponding to the positioning component, and the fixing component includes a hook that engages with the upright component of the heat dissipation member, the hook being configured to be bent in a direction that intersects an attachment direction of the heat dissipation member relative to the fixing component while the upright component is being attached to the fixing component.

In accordance with an eighth aspect, with the display device according to the first aspect, the positioning component and the fixing component are integrally formed on the holding member by cutting and lifting a sheet metal.

In accordance with a ninth aspect, with the display device according to the first aspect, the holding member has a rectangular shape, the holding member integrally including a plurality of positioning components and a plurality of fixing components, the heat dissipation member extends in a direction in which one side of the holding member extends, and the positioning components and the fixing components are arranged with respect to each other in the direction in which the heat dissipation member extends.

In accordance with a tenth aspect, with the display device according to the second aspect, the contact component has a first dimension measured in a direction from the front side to the rear side, and the warping suppressor has a second dimension measured in the direction from the front side to the rear side, with the second dimension being larger than the first dimension.

In accordance with an eleventh aspect, with the display device according to the tenth aspect, the heat dissipation member has a thickness that is smaller than the first dimension of the contact component.

In accordance with a twelfth aspect, with the display device according to the seventh aspect, the upright component has a third dimension measured in a direction from a front side of the display device to the rear side, and the hook has a fourth dimension measured in the direction from the front side to the rear side, with the fourth dimension being larger than the third dimension.

In accordance with a thirteenth aspect, with the display device according to the twelfth aspect, the hook has a distal end portion that extends in a direction that intersects the direction from the front side to the rear side, the distal end portion having a fifth dimension measured in the direction that intersects the direction from the front side to the rear side, with the fifth dimension being larger than a thickness of the upright component.

In accordance with a first mode, a display device comprises: a display component; a light source that irradiates the display component with light; a substrate to which the light source is mounted; and a cabinet to which the substrate is attached, the cabinet including a positioning component that positions the substrate.

In accordance with a second mode, with the display device according to the first mode, the display component has a rectangular shape, and the substrate has a rectangular shape, a longitudinal direction of the substrate directing in a longitudinal direction of the display component.

In accordance with a third mode, with the display device according to the second mode, the positioning component is disposed near a long side of the substrate.

In accordance with a fourth mode, with the display device according to the third mode, the cabinet includes a plurality of positioning components disposed on both sides of the substrate, respectively.

In accordance with a fifth mode, with the display device according to the fourth mode, the positioning components are disposed offset in the longitudinal direction of the substrate.

In accordance with a sixth mode, with the display device according to the fourth mode, the cabinet includes at least one positioning component disposed on one side of the substrate and at least one positioning component disposed on the other side of the substrate, the number of the at least one positioning component disposed on the one side of the substrate being different from the number of the at least one positioning component disposed on the other side of the substrate.

In accordance with a seventh mode, the display device according to the fourth mode, further comprises a stand that supports the display device near an outer edge portion of the display device that extends substantially parallel to the longitudinal direction of the substrate, the cabinet includes at least one positioning component disposed on one side of the substrate and at least one positioning component disposed on the other side of the substrate, the one side of the substrate is closer to the outer edge portion of the display device than the other side of the substrate, the number of the at least one positioning component disposed on the one side of the substrate being larger than the number of the at least one positioning component disposed on the other side of the substrate.

In accordance with an eighth mode, with the display device according to the second mode, a distance from one end of the substrate to the light source in the longitudinal direction of the substrate is different from a distance from the one end of the substrate to the positioning component.

In accordance with a ninth mode, with the display device according to the first mode, the positioning component is integrally formed with the cabinet.

In accordance with a tenth mode, with the display device according to the ninth mode, the positioning component substantially perpendicularly protrudes from a surface of the cabinet over which the light source is arranged.

In accordance with an eleventh mode, with the display device according to the first mode, the positioning component has a larger dimension than the substrate in a direction perpendicular to a surface of the substrate to which the light source is mounted.

In accordance with a twelfth mode, with the display device according to the first mode, the positioning component includes a fixing component that fixes the substrate.

In accordance with a thirteenth mode, with the display device according to the second mode, the light source includes a lens, and the substrate has a wider width than the lens in a transverse direction of the substrate.

In accordance with a fourteenth mode, with the display device according to the second mode, the substrate has a plurality of substrates arranged with respect to each other in a transverse direction of the display component.

In accordance with a fifteenth mode, with the display device according to the fourteenth mode, the cabinet includes a plurality of positioning components arranged relative to the substrates, respectively, the positioning components being substantially aligned in the transverse direction of the display component.

In accordance with a sixteenth mode, with the display device according to the second mode, the positioning component is located near a center portion of the cabinet in the longitudinal direction of the display component.

In accordance with a seventeenth mode, with the display device according to the second mode, the cabinet includes a plurality of positioning components symmetrically arranged each other with respect to a center portion of the cabinet in the longitudinal direction of the display component.

In accordance with an eighteenth mode, with the display device according to the first mode, the cabinet includes a recess component in a surface of the cabinet to which the substrate is attached, and the positioning component is disposed at a location other than the recess component.

In accordance with a nineteenth mode, with the display device according to the eighteenth mode, the recess component has two portions parallely extending in a transverse direction of the display component and a portion extending in a longitudinal direction of the display component between ends of the two portions, and the positioning component is disposed inside an area formed by the two portions and the portion of the recess component.

In accordance with a twentieth mode, the display device according to the nineteenth mode, further comprises a heat dissipation member that contacts with the substrate and the positioning component.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
   a display;
   a light source;
   a substrate to which the light source is mounted; and
   a housing including a back panel with a surface to which the substrate is attached, the back panel having
      a recess that is at least partially disposed in the surface and is recessed with respect to the surface, and
      a positioning portion that holds the substrate relative to the housing and is disposed spaced apart from the recess in the surface.

2. The display device according to claim 1, wherein the substrate at least partially overlaps with the recess as viewed in a direction perpendicular to a display surface of the display.

3. The display device according to claim 1, wherein the recess extends in a transverse direction of the display device and has a dimension in the traverse direction that is larger than a dimension of the substrate in the transverse direction.

4. The display device according to claim 3, wherein the recess extends across the substrate in the transverse direction.

5. The display device according to claim 1, wherein the recess includes a plurality of recesses.

6. The display device according to claim 5, wherein the recesses have different lengths measured in lengthwise directions of the recesses, respectively.

7. The display device according to claim 1, wherein the display has a rectangular shape, and
   the substrate has a substantially rectangular shape, a longitudinal direction of the substrate directing in a longitudinal direction of the display.

8. The display device according to claim 1, wherein the positioning portion is arranged offset relative to the light source in a longitudinal direction of the display device.

9. The display device according to claim 1, wherein the positioning portion is integrally formed with the back panel.

10. The display device according to claim 9, wherein the positioning portion is integrally formed with the back panel as a one piece, unitary member.

11. The display device according to claim 9, wherein the positioning portion substantially perpendicularly protrudes from the surface.

12. The display device according to claim 1, wherein the positioning portion has a larger dimension than the substrate in a direction perpendicular to a display surface of the display.

13. The display device according to claim 1, wherein the positioning portion has a plurality of positioning portions that is arranged with respect to each other in a longitudinal direction of the display device, the positioning portions holding the substrate relative to the housing.

14. The display device according to claim 13, wherein the recess is disposed between an adjacent pair of the positioning portions in the longitudinal direction.

15. The display device according to claim 13, wherein the positioning portions are symmetrically arranged each other with respect to a center axis of the display device that extends in a transvers direction of the display device.

16. The display device according to claim 1, wherein the substrate has a plurality of substrates that is arranged with respect to each other in a transverse direction of the display device.

17. The display device according to claim 16, wherein the positioning portion has a plurality of positioning portions, the positioning portions holding the substrates relative to the housing, respectively.

18. The display device according to claim 17, wherein a pair of the positioning portions is substantially aligned in a transverse direction of the display device.

19. The display device according to claim 1, wherein the recess is recessed away from the display with respect to the surface.

20. A display device comprising:
a display;
a light source;
a substrate to which the light source is mounted; and
a housing including a back panel with a surface to which the substrate is attached, the back panel having
a recess that is recessed with respect to the surface and is at least partially disposed in the surface at a location that at least partially overlaps with the substrate as viewed in a direction perpendicular to a display surface of the display, and
a positioning portion that holds the substrate relative to the housing.

* * * * *